US007995115B2

(12) United States Patent
Kurane

(10) Patent No.: US 7,995,115 B2
(45) Date of Patent: Aug. 9, 2011

(54) IMAGE PICKUP DEVICE, IMAGE PICKUP SYSTEM, IMAGE PICKUP METHOD, AND IMAGE PROCESSING DEVICE

(75) Inventor: Haruhisa Kurane, Shiojiri (JP)

(73) Assignee: Seiko Epson Corporation (JP)

( * ) Notice: Subject to any disclaimer, the term of this patent is extended or adjusted under 35 U.S.C. 154(b) by 842 days.

(21) Appl. No.: 12/033,348

(22) Filed: Feb. 19, 2008

(65) Prior Publication Data

US 2008/0291289 A1 Nov. 27, 2008

(30) Foreign Application Priority Data

Feb. 20, 2007 (JP) ................... 2007-038918
Dec. 28, 2007 (JP) ................... 2007-339521

(51) Int. Cl.
*H04N 5/228* (2006.01)
*G03B 7/093* (2006.01)
(52) U.S. Cl. ................... 348/229.1; 348/222.1; 382/284
(58) Field of Classification Search .................. None
See application file for complete search history.

(56) References Cited

U.S. PATENT DOCUMENTS

| 5,801,773 | A * | 9/1998 | Ikeda ................. | 348/229.1 |
| 7,202,892 | B1 * | 4/2007 | Ogata et al. ............ | 348/229.1 |
| 7,660,464 | B1 * | 2/2010 | Peterson ............. | 382/181 |
| 7,791,657 | B2 * | 9/2010 | Joshi et al. ............ | 348/262 |
| 2003/0117412 | A1 * | 6/2003 | Brooksby et al. ............ | 345/589 |
| 2006/0188163 | A1 * | 8/2006 | Elder ............. | 382/232 |
| 2007/0237391 | A1 * | 10/2007 | Wu ................. | 382/166 |

FOREIGN PATENT DOCUMENTS

JP 2000-188717 7/2000

OTHER PUBLICATIONS

Battiato, et al. "High Dynamic Range Imaging for Digital Still Camera." Journal of Electronic Imaging, 12:3, Jul. 2003.*
Xu, et al. "High Dynamic Range Still Image Encoding in JPEG 2000." IEEE Computer Graphics and Applications, 25:6, Nov. 2005.*

* cited by examiner

*Primary Examiner* — Nicholas G Giles
*Assistant Examiner* — Dwight Alex C Tejano
(74) *Attorney, Agent, or Firm* — Harness, Dickey & Pierce, P.L.C.

(57) ABSTRACT

An image pickup device includes: an image pickup unit which picks up a subject at first and second exposure times; a high dynamic range (HDR) image data generating unit which generates first HDR image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up the subject at the first exposure time and second image data obtained by picking up the subject at the second exposure time; an image processing unit which performs a predetermined image process including a floating-point arithmetic operation process, with respect to the first HDR image data generated by the HDR image data generating unit; and a HDR image data converting unit which converts the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

10 Claims, 3 Drawing Sheets

IMAGE PICKUP DEVICE, IMAGE PICKUP SYSTEM, IMAGE PICKUP METHOD, AND IMAGE PROCESSING DEVICE

BACKGROUND

1. Technical Field

The present invention relates to an image pickup device, an image pickup system, an image pickup method, an image processing device, and an image pickup method, which are capable of reducing the amount of HDR image data in a state of ensuring a relatively wide gradation range and dynamic range.

2. Related Art

With many pixels and miniaturization of an image pickup device, a pixel size (sensor cell) is miniaturized and, as a result, the amount of saturation charges is reduced and a dynamic range (D range) narrows.

In order to compensate for narrowness of the D range of the image pickup device, an image pickup device capable of performing photographing at two types or more of exposure times in one frame period is suggested. In an image pickup device in which two fields configure one frame, an image pickup method for changing an exposure time by an odd-numbered or even-numbered field is also suggested and thus wide D range photographing is possible. In particular, in a complementary metal oxide semiconductor (CMOS) sensor, plural numbers of times of sampling or multiple channels are possible in an image pickup period of one frame by the research on a circuit configuration. According to a nondestructive readable sensor, plural numbers of times of sampling are facilitated.

Images photographed at two types or more of exposure times (for example, a standard exposure time, a short exposure time or the like) are synthesized by an external unit or an internal unit of the sensor, thereby obtaining a wide D range image. In a known image display device, from a limitation of a contrast ratio which can be expressed, tone mapping for reducing the information amount by 50 dB or 8 bit is performed. Since the information amount of the image of the wide D range is reduced into the limited dynamic range (D range), an image having a low contrast ratio (which is different from an image which can be viewed by a person) is obtained.

As a technology of compressing an image according to the capability of an output device, for example, there is an image pickup device described in JP-A-2000-188717.

In a computer field such as a personal computer (PC), a computer graphic (CG) technology for modeling a three-dimensional shape, the reflectivity and the color tone of a subject or a light source, virtually deciding the position of the light source and the position of a viewing point (camera), and determining how a two-dimensional image is viewed from the viewing point by computation is used in movie, design and game fields. The CG technology can treat an infinite D range by a high dynamic range (HDR) image for representing an image to a floating-point and can represent a natural image close to an image viewed by a personal without overexposure or underexposure. In general, in order to generate the HDR image, expensive computation resources, dedicated software, programming technologies, vast computation resources and time are necessary.

In a difference between the former (image pickup device) and the latter (CG technology) in generation of an image (formation of a picture), the former (image pickup device) forms and records a picture in consideration of the D range of the output device in the device (since the D range is fixed, a fixed-point process is used). In the former, gradation information is lost in order to compress contrast information of brightness and, as a result, if the recorded image is secondarily used, for example, if the image is displayed in a display device or is printed, the image cannot be sufficiently reproduced at the output device. In contrast, in the CG technology, since the image is generated by a floating-point process, the contrast information is not lost. Accordingly, if the image is secondarily used, a final image can be generated on the basis of the capability or the characteristics of the display device or the visibility of a user and more natural sensitive image (close to the sensitivity of a person) can be expressed.

In a floating-point arithmetic operation of physical simulation, since an arithmetic operation result of any time is used in an arithmetic operation at a next time, accumulation of operation errors may be problematic when a system performs an objective operation. In a three-dimensional CG technology, if a viewing point is changed on the basis of any rule, arithmetic operation errors are accumulated and thus an image may be damaged.

Meanwhile, if image processing is performed while photographing a nature image, since information (image) to be processed is always updated, a problem such as the accumulation of the arithmetic operation errors is not caused. In contrast, a problem such as overexposure or underexposure due to a narrow D range causes lack of pixel information and thus may be problematic when the system performs an objective operation. In particular, in the overexposure, it cannot be determined whether it is an image or a defect in machine vision and an operation different from the object is performed by the system. In the machine vision, since the image is globally (macro) grasped in area detection (labeling), edge detection, correlation detection, binarization process, the system capability such as recognition depends on the information loss such as overexposure or underexposure, rather than arithmetic operation errors of the pixel value. That is, in the machine vision, rather than reducing of arithmetic operation errors by the fixed-point arithmetic operation, it is important that a fixed point is converted into a floating-point so as to adjust the D range to be close to the characteristics of person's eyes (high-precision), thereby obtaining a sufficient contrast ratio.

However, in the technology of JP-A-2000-188717, since the arithmetic operation process of the image pickup device is performed by the fixed-point arithmetic operation, if the bit number of an image treated is increased, the number of arithmetic devices used in the arithmetic operation is exponentially increased as the bit number is increased. Thus, a circuit scale or circuit cost may be remarkably increased.

Since the output of the image pickup device becomes image data of which the pixel values are expressed by an integer, contrast information may be lost.

SUMMARY

An advantage of some aspects of the invention is that it provides an image pickup device, an image pickup system, an image pickup method, an image processing device, and an image processing method, which are capable of reducing the amount of HDR image data in a state of ensuring a relatively wide gradation range and dynamic range and relatively reducing a circuit scale necessary for various types of image processes.

According to a first aspect of the invention, there is provided an image pickup device including: an image pickup unit which picks up a subject at first and second exposure times; a high dynamic range (HDR) image data generating unit which generates first HDR image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up the subject at the first exposure time and second image data obtained by picking up the subject at the second exposure time; an image processing unit which performs a predetermined image process including a floating-point arithmetic operation process, with respect to the first HDR image data generated by the HDR image data generating unit; and a HDR image data converting unit which converts the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

By this configuration, the image pickup unit can pick up the subject at the first and second exposure times. The HDR image data generating unit can generate the first HDR image data configured by pixel data of which pixel values are expressed by the floating-point form in which the mantissa part has N bits (N is a natural number of 2 or more), the cardinal number is X (X is a natural number of 2 or more) and the exponential part of the cardinal number has M bits (M is a natural number of 2 or more), on the basis of first and second image data obtained by picking up the subject using the image pickup unit at the first and second exposure times. The image processing unit can perform the predetermined image process including the floating-point arithmetic operation process with respect to the first HDR image data generated by the HDR image data generating unit.

The HDR image data converting unit can convert the first HDR image data after the image process into second HDR image data configured by pixel data of which the pixel values are expressed by a floating-point form in which the mantissa part has n bits (n is a natural number of N>n), the cardinal number is X, and the exponential part of the cardinal number has m bits (m is a natural number of M>m).

Accordingly, since the HDR image data can be treated as the floating-point form in which the bit numbers of the mantissa part and the exponential part are fixed, the multiplication of the image process such as a color interpolation process, a detail process, and a noise removing process can be performed by the multiplication of the mantissa parts and the adding of the exponential parts. Thus, it is possible to reduce a circuit scale compared with the case of performing the multiplication in a fixed-point form. For example, in order to ensure internal arithmetic operation precision, the fixed-point multiplier performs bit expansion, for example, expands a value to 10-bit integer part and 6-bit fraction part so as to configure a 16-bit multiplier. In contrast, a floating-point multiplier includes a multiplier having 10 bits and an adder having 10 bits or less. In the multiplier and the adder, the multiplier is susceptible to be increased and the increase of the circuit scale according to the increase of the bit number is exponentially increased. The circuit scale has an influence on a processing speed. Thus, in general, the processing speed is increased as the circuit scale is decreased.

Since the conversion of the bit numbers of the mantissa part and the exponential part of the first HDR image data of the floating-point form is performed so as to compress the amount of data in the floating-point form, for example, if the image is desired to be displayed or printed so as to be viewed (or appreciated) by a person, it is possible to compress the amount of data in a state of maintaining a sufficient contrast ratio and dynamic range with respect to the recognition capability of the image viewed by the eyes of the person. Accordingly, it is possible to output the HDR image data in an output form suitable for the purpose of the output and reduce a memory capacity necessary for the storage of HDR image data or a bus width necessary for transmission of the HDR image data, by the compression of the data.

For example, 32-bit HDR image data (integer value) is converted into 8-bit integer value in the past, but is, for example, converted into a floating-point in which the mantissa part has 8 bits and the exponential part has 4 bits in the present embodiment. Accordingly, the amount of data is increased by 4 bits, but the HDR image data having a dynamic range of about 32000 times of the known dynamic range (50 db) can be obtained.

In the fixed-point arithmetic operation, an arithmetic operation (rounding) error (=noise) is constant because the D range is fixed, but, in the floating-point arithmetic operation, the arithmetic operation error varies by the range (value of the exponential part). In contrast, in an image (signal), image quality depends on S/N. In the floating-point arithmetic operation, the exponential parts of the denominator and the numerator of the S/N are cancelled by each other and, as a result, the arithmetic operation error (noise) is decided by the bit number (resolution) of the mantissa part and is not influenced by the exponential part. Accordingly, deterioration in S/N due to the arithmetic operation error does not depend on the exponential part and the floating-point image processing operation is not problematic in view of precision (error).

Since the exposure control makes the level of a signal output from a light-receiving element uniform regardless of the brightness of a subject and sets the output value (image data) of the light-receiving element to the floating-point form such that the mantissa part is allocated to the output signal value and the exposure amount is allocated to the exponential part, it is possible to maintain the signal level without saturation or rounding.

Here, the image pickup unit has a sensor cell array configured by a charge coupled device (CCD) or a complementary metal oxide semiconductor (CMOS), controls exposure times by an electronic shutter function, controls reading timing, reset timing or the like of each exposure time, and picks up a subject at plural types of exposure times (first and second exposure times). The image data obtained by pickup is, for example, converted into digital image data and is output. Hereinafter, the same is true in aspects relating to an image pickup system, an image pickup method, an image processing device and an image processing method.

The HDR image data is generated by combining a non-saturation pixel data of image data obtained by picking up a subject at a standard exposure time and image data obtained by picking up the subject at a short exposure time. In more detail, for example, saturated image data of the image data obtained by picking up the subject at the standard exposure time is substituted by unsaturated image data of the image data obtained by picking up the subject at the short exposure time, thereby generating the HDR image data. Hereinafter, the same is true in aspects relating to an image pickup system, an image pickup method, an image processing device and an image processing method.

In the image pickup device of a second aspect of the invention, the HDR image data generating unit may include an image synthesis unit which synthesizes the first image data and the second image data and generates HDR image data configured by pixel data of which pixel values are expressed by a fixed-point form, and a floating-point processing unit which converts the HDR image data into the first HDR image data.

By this configuration, the image synthesis unit can synthesize the HDR image data of the fixed-point form corresponding to the first and second exposure times, which is acquired from the image pickup unit, and generate the HDR image data of the fixed-point form. The floating-point processing unit can convert the HDR image data of the fixed-point form into the first HDR image data configured by the pixel data of which the pixel values are expressed by the floating-point form in which the mantissa part has N bits, the cardinal number is X and the exponential part of the cardinal number has M bits.

In the image pickup device of a third aspect of the invention, the HDR image data generating unit may include a floating-point processing unit which converts the first image data and the second image data into image data configured by pixel data of which the pixel values are expressed by the floating-point form in which the mantissa part has the N bits, the cardinal number is X, the exponential part of the cardinal number has the M bits, and an image synthesis unit which synthesizes the first and second image data after conversion and generates the first HDR image data.

By this configuration, the floating-point processing unit can convert the image data of the fixed-point form corresponding to the first and second exposure times, which is acquired from the image pickup unit, into the HDR image data configured by the pixel data of which the pixel values are expressed by the floating-point form in which the mantissa part has N bits, the cardinal number is X and the exponential part of the cardinal number has M bits. The image synthesis unit can synthesize the image data after conversion to the floating-point form and generate the first HDR image data.

In the image pickup device of a fourth aspect of the invention, the HDR image data generating unit may generate the first HDR image data in which the values of the exponential parts of the pixel data configuring pixel elements are set to the same value, for each pixel element configuring an image of the subject.

By this configuration, at the time of reproduction of the image of the subject, an image without uncomfortable feeling can be reproduced even when the reproduction is performed using only the mantissa part. This is because the image of only the mantissa part when the exponential part is uniform in the image elements corresponds to an image in which valid areas of the image data having different exposure times (exposure amounts) overlap each other.

Here, the image element is a pixel area having similar brightness of the image of the subject. For example, if an image element having different brightness, such as a wall or a window, exists, the wall or the window becomes the image element. Hereinafter, the same is true in aspects relating to an image pickup system, an image pickup method, an image processing device and an image processing method.

In the image pickup device of a fifth aspect of the invention, the image pickup unit may output the first image data, which is configured by a pixel signal including a signal relating to any one of a plurality of color elements corresponding to predetermined color spaces in the unit of a pixel and is obtained by picking up the subject at the first exposure time, and the second image data, which is configured by a pixel signal including a signal relating to any one of the plurality of color elements corresponding to the predetermined color spaces in the unit of the pixel and is obtained by picking up the subject at the second exposure time; the HDR image data generating unit may generate the first HDR image data configured by the pixel data including the pixel value relating to any one of the plurality of color elements in the unit of the pixel, on the basis of the pixel signal configuring the first image data and the pixel signal configuring the second image data corresponding to the pixel signal configuring the first image data; the image processing unit may perform a color interpolation process with respect to the first HDR image data and generate the first HDR image data configured by the pixel data including the pixel value relating to each of the plurality of color elements in the unit of the pixel; and the HDR image data converting unit may convert the value of the mantissa part and the value of the exponential part of the pixel data configuring the first HDR image data such that the second HDR image data is configured by the pixel data including the pixel value relating to the plurality of color elements and the value of the exponential part of the pixel data becomes the same value in the plurality of color elements in the unit of the pixel.

By this configuration, the first HDR image data configured by pixel data including a pixel value relating to any one of the plurality of color elements corresponding to predetermined color spaces in the unit of the pixel can be generated, and the color interpolation process is performed with respect to the first HDR image data such that the first HDR image data configured by the pixel data including the pixel value relating to the color elements in the unit of the pixel can be generated (at this point, the values of the exponential parts of the respective color elements are different).

The value of the mantissa part of the value of the exponential part of the pixel data configuring the first HDR image data after the color interpolation process can be converted such that the values of the exponential parts of the pixel data of the second HDR image data obtained by the conversion become the same value in the plurality of color elements in the unit of the pixel.

Accordingly, since the second HDR image data can be compiled to the data of the plurality of mantissa parts corresponding to the color elements and the data of one exponential part common to the plurality of color elements in the unit of the pixel, it is possible to further reduce the data capacity of the second HDR image data for output.

In the HDR image data converting unit, in the conversion into the second HDR image data, the converting process is preferably performed such that the pixel values are not saturated. For example, the converting process is performed according to a pixel value having a largest exponential part.

In the image pickup device of a sixth aspect of the invention, the image pickup unit may output the first color image data, which is configured by a color pixel signal including a signal relating to a plurality of color elements corresponding to predetermined color spaces in the unit of a pixel and is obtained by picking up the subject at the first exposure time, and the second color image data, which is configured by a color pixel signal including a signal relating to the plurality of color elements corresponding to the predetermined color spaces in the unit of the pixel and is obtained by picking up the subject at the second exposure time; the HDR image data generating unit may generate the first HDR image data configured by the pixel data including the pixel value relating to each of the plurality of color elements in the unit of the pixel, on the basis of the color pixel signal configuring the first color image data and the color pixel signal configuring the second color image data corresponding to the color pixel signal configuring the first color image data; and the HDR image data converting unit may convert the values of the mantissa part and the value of the exponential part of the pixel data configuring the first HDR image data such that the second HDR image data is configured by the pixel data including the pixel value relating to the plurality of color elements and the value of the exponential part of the pixel data becomes the same value in the plurality of color elements in the unit of the pixel.

By this configuration, the first and second color image data configured by the pixel signals corresponding to the first and second exposure times and corresponding to the plurality of color elements in the unit of the pixel can be acquired, and the first HDR image data configured by the pixel data including the plurality of pixel values relating to the color elements in the unit of the pixel can be generated on the basis of the first and second color image data.

The value of the mantissa part and the value and the exponential part of the pixel data configuring the first HDR image data can be converted such that the values of the exponential parts of the pixel data of the second HDR image data obtained by the conversion become the same value in the plurality of color elements in the unit of the pixel.

Accordingly, since the second HDR image data can be compiled to the data of the plurality of mantissa parts corresponding to the color elements and the data of one exponential part common to the plurality of color elements in the unit of the pixel, it is possible to further reduce the data capacity of the second HDR image data for output.

In the HDR image data converting unit, in the conversion into the second HDR image data, the converting process is preferably performed such that the pixel values are not saturated. For example, the converting process is performed according to a pixel value having a largest exponential part.

In the image pickup device of a seventh aspect of the invention, the cardinal number may be 2.

By this configuration, since the pixel data of the first and second HDR image data becomes the data of the floating-point form having the cardinal number of 2, the data which is susceptible to be treated in the image pickup device can be obtained.

Here, the image pickup device manages (expresses) the exposure amount by an EV value. This EV value becomes twice or ½ the exposure amount whenever 1 EV is changed. That is, when the cardinal number is 2, if the exposure amount (EV value) is decreased by one step in order to pick up a bright image, this is equivalent to the increase of the value of the exponential part of the first or second HDR image data by 1. In contrast, when the exposure amount (EV value) is increased by one step in order to pick up a dark image, this is equivalent to the decrease of the value of the exponential part by 1.

In the image pickup device of an eighth aspect of the invention, when the mantissa part of the pixel data configuring the first HDR image has 9 bits or more and the exponential part has 5 bits or more, the HDR image data converting unit may convert the first HDR image data into the second HDR image data configured by the pixel data in which the mantissa part has 8 bits and the exponential part has 4 bits.

By this configuration, since the second HDR image data is configured by the pixel data of the floating-point form in which the mantissa part has 8 bits and the exponential part has 4 bits, the gradation property can be expressed by the 8 bits of the mantissa part and the dynamic range can be expressed by the 4 bits of the exponential part.

Accordingly, it is possible to obtain image data having image quality close to the recognition capability of the image viewed by the eyes of a person. Here, the recognition capability of the image viewed by the eyes of the person indicates that the resolution of the gradation property has 8 bits and the dynamic range is about 100 dB. If the exponential part has 4 bits, it is possible to increase the dynamic range to about 32000 times of the known dynamic range (50 dB).

In the image pickup device of a ninth aspect of the invention, the image processing unit may include a multiplying circuit which performs a multiplying process with respect to the value of the mantissa part of the pixel data configuring the first HDR image data and an adding circuit which performs an adding process with respect to the value of the exponential part thereof.

By this configuration, a multiplying process of the floating-point values can be performed by a multiplying process of the mantissa parts using the multiplying circuit and an adding process of the exponential parts using the adding circuit.

Accordingly, it is possible to reduce the circuit scale compared with a circuit configuration for performing a multiplying process using a fixed-point arithmetic operation.

According to a tenth aspect of the invention, there is provided an image pickup system including: an image pickup unit which picks up a subject at first and second exposure times; a high dynamic range (HDR) image data generating unit which generates first HDR image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up the subject at the first exposure time and second image data obtained by picking up the subject at the second exposure time; an image processing unit which performs a predetermined image process including a floating-point arithmetic operation process, with respect to the first HDR image data generated by the HDR image data generating unit; and a HDR image data converting unit which converts the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

By this configuration, the same operation and effect as the image pickup device of the first aspect can be obtained.

Here, the present system may be realized as a single device, terminal or other apparatus or may be realized as a network system in which a plurality of devices, terminals and other apparatuses are connected to each other so as to perform communication therebetween. In the latter case, if the components are connected to each other so as to perform the communication, the components may belong to any one of the plurality of apparatuses.

According to an eleventh aspect of the invention, there is provided an image pickup method including: picking up a subject at first and second exposure times; generating first high dynamic range (HDR) image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up the subject at the first exposure time and second image data obtained by picking up the subject at the second exposure time; performing a predetermined image process including a floating-point arithmetic operation process, with respect to the first HDR image data generated by the generating of the HDR image data; and converting the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

By this configuration, the same operation and effect as the image pickup device of the first aspect can be obtained.

According to a twelfth aspect of the invention, there is provided an image processing device including: a high dynamic range (HDR) image data generating unit which generates first HDR image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up a subject at the first exposure time and second image data obtained by picking up the subject at the second exposure time; an image processing unit which performs a predetermined image process including a floating-point arithmetic operation process, with respect to the first HDR image data generated by the HDR image data generating unit; and a HDR image data converting unit which converts the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

By this configuration, the same operation and effect as the image pickup device of the first aspect can be obtained.

According to a thirteenth aspect of the invention, there is provided an image processing method including: generating first high dynamic range (HDR) image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up a subject at the first exposure time and second image data obtained by picking up the subject at the second exposure time; performing a predetermined image process including a floating-point arithmetic operation process, with respect to the first HDR image data generated by the generating of the HDR image data; and converting the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

By this configuration, the same operation and effect as the image pickup device of the first aspect can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
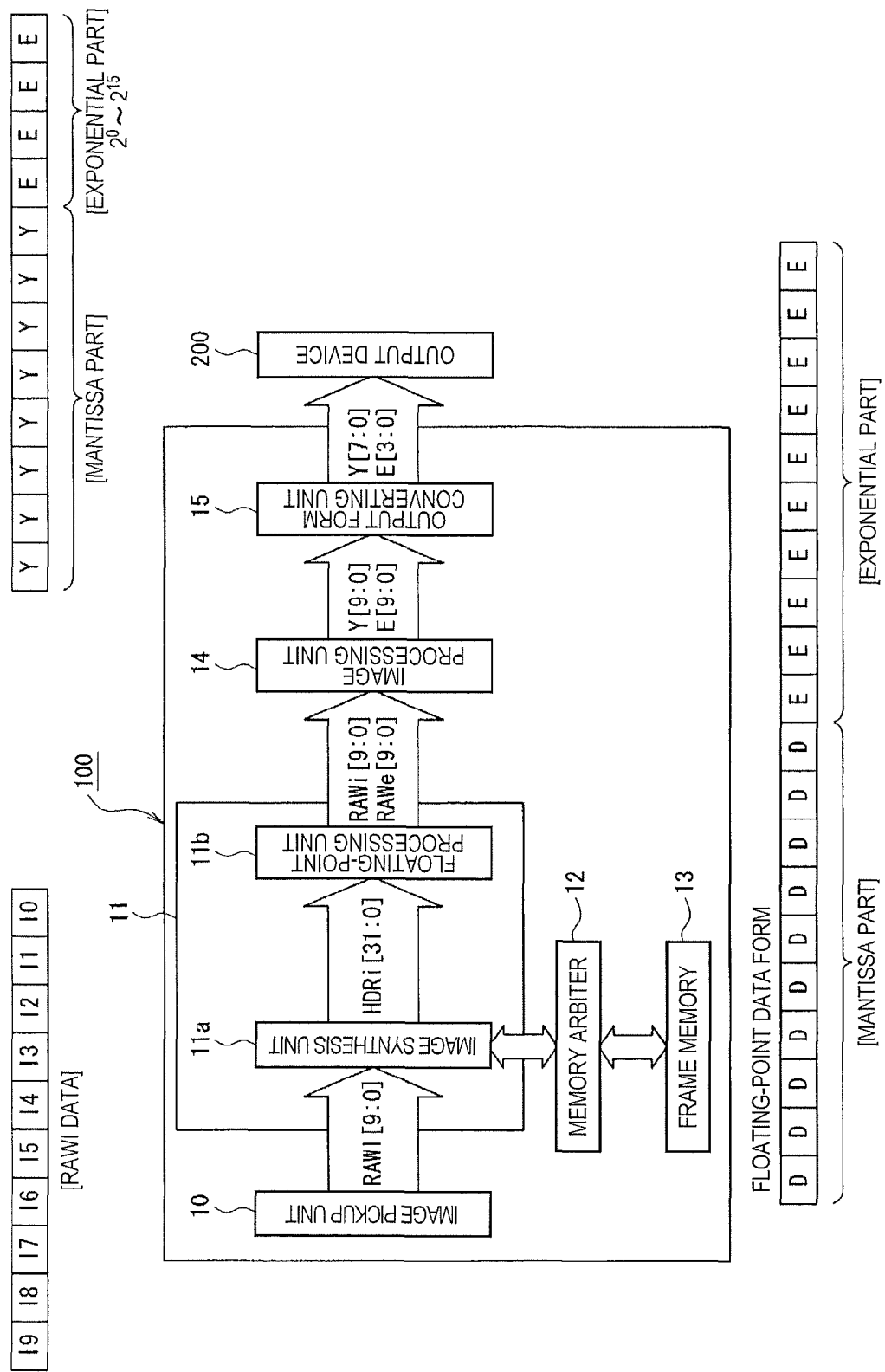
FIG. 1 is a block diagram showing the configuration of an image pickup device 100.
Figure 2:
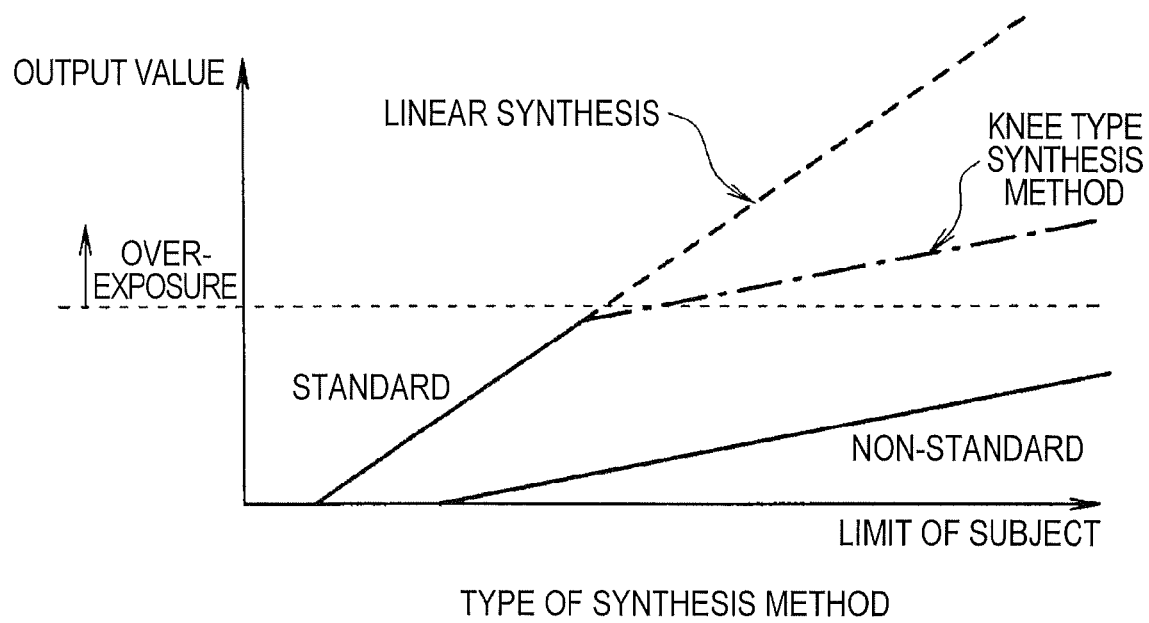
FIG. 2 is a view showing the type of an image synthesis method.

Hereinafter, an image pickup device, an image pickup system, an image pickup method, an image processing device and an image processing method according to a first embodiment of the invention will be described with reference to the accompanying drawings. FIGS. 1 and 2 are views showing the image pickup device, the image pickup system, the image pickup method, the image processing device and the image processing method according to the first embodiment of the invention. FIG. 1 is a block diagram showing the configuration of the image pickup device 100.

Hereinafter, the configuration of the image pickup device 100 will be described with reference to FIG. 1.

As shown in FIG. 1, the image pickup device 100 includes an image pickup unit 10 for photographing a subject at a plural types of exposure times, a HDR image data generating unit 11 for generating first HDR image data of a floating-point form on the basis of image data of the subject photographed at the plural types of exposure times in the image pickup unit 10, a memory arbiter 12 for controlling writing and reading of data between an image synthesis unit 11a and a frame memory 13, the frame memory 13 for storing the image data, an image processing unit 14 for performing image processing such as a noise removing process with respect to the first HDR image data of the floating-point form, and an output form converting unit 15 for converting the output form of the first HDR data after image processing.

The image pickup unit 10 includes a sensor cell array composed of a plurality of sensor cells (CMOS), a timing controller, an analog front end (AFE) and, in the present embodiment, has a function for picking up a subject corresponding to a standard exposure time in a first frame period (one exposure period) and picking up a subject corresponding to a short exposure time shorter than the standard exposure time (standard exposure time>short exposure time) in the same frame period as the exposure of the standard exposure time (which can be arbitrarily set by a user). Although the subject is picked up at the two types of exposure times, the invention is not limited thereto and the subject may be picked up at three types or more of exposure times.

The image pickup unit also has a function for outputting the image data obtained by picking up the subject at the two types of exposure times to the HDR image data generating unit 11 independently or in parallel using two output channels (CH1 and CH2). In the present embodiment, the image data (hereinafter, referred to as standard exposure image data) obtained by picking up the subject at the standard exposure time is output from CH1 and the image data (hereinafter, referred to as short exposure image data) obtained by picking up the subject at the short exposure time is output from CH2.

In the present embodiment, the standard exposure image data and the short exposure image data obtained by the image pickup unit 10 are composed of data of a fixed-point form including 10-bit pixel data. Hereinafter, this pixel data is referred to as RAWI data.

The HDR image data generating unit 11 includes the image synthesis unit 11a and the floating-point processing unit 11b.

The image synthesis unit 11a includes a multiplier and an adder and reads RAWI data (hereinafter, referred to as standard exposure RAWI data) corresponding to the standard exposure time and RAWI data (hereinafter, referred to as short exposure RAWI data) corresponding to the short exposure time from the frame memory 13 through the memory arbiter 12, for each pixel of the image pickup unit 10. The read standard exposure RAWI data and short data RAWI data are multiplied by a predetermined coefficient according to an exposure ratio by the multiplier and the multiplied standard exposure RAWI data and short exposure RAWI data are added by the adder (linear synthesis), thereby generating HDR image data of which the pixel value is composed of 32-bit pixel data of the fixed-point form. Hereinafter, the pixel data configuring the HDR image data is referred to as HDRi data.

FIG. 2 is a view showing the type of an image synthesis method.

As the image synthesis method when generating the HDR image data, as shown in FIG. 2, there is a Knee type synthesis method, in addition to the above-described linear synthesis method. In the Knee type synthesis method, the image data of the standard exposure time and the image data of the non-standard exposure time (short exposure time) are added to obtain image data (HDR image data) having a wide dynamic range.

Although not shown, there is also a method for selecting unsaturated RAWI data from the RAWI data corresponding to the plural types of exposure times for each pixel and multiplying the selected RAWI data by a coefficient according to an exposure ratio (this method is also included in the linear synthesis method).

The floating-point processing unit 11b converts the HDRi data generated by the image synthesis unit 11a into pixel data (hereinafter, referred to as first HDR pixel data) of a floating-point form, in which a mantissa part has N bits (N is a natural number of 32>N≧2), a cardinal number is X (X is a natural number of 2 to 10), and an exponential part of the cardinal number has M bits (M is a natural number of 32>M≧2).

The first HDR image data is composed of the first HDR pixel data of one frame.

In the first HDR pixel data, the mantissa part (N bits) is RAWi and the exponential part (M bits) is RAWe. A set of RAWi and RAWe is output to the image processing unit 14.

When a read instruction is output from the image synthesis unit 11a, the memory arbiter 12 reads the standard exposure RAWI data and the short exposure RAWI data indicated by the output read instruction from the frame memory 13 and outputs the RAWI data to a read instruction output source. When a write instruction is output from the image synthesis unit 11a, the memory arbiter 12 writes the standard exposure RAWI data and the short exposure RAWI data indicated by the output write instruction to the frame memory 13.

The frame memory 13 stores the standard exposure RAWI data and the short exposure RAWI data input from the image pickup unit 10 to the image synthesis unit 11a for each line of the pixel through the memory arbiter 12 for each line and buffers (accumulates) the RAWI data in order to synchronize the two types of RAWI data in a next image synthesis process. Alternatively, the two types of RAWI data of one frame are accumulated and then are output to the image synthesis unit 11a through the memory arbiter 12 independently or in parallel. That is, the memory arbiter 12 and the frame memory 13 also function as a delay unit.

The image processing unit 14 includes a multiplier and an adder and performs an image process such as a process of increasing spatial resolution, a process of correcting a brightness level and a process of removing noise, with respect to the first HDR pixel data {RAWi, RAWe} received from the HDR image data generating unit 11 and outputs the first HDR pixel data {Y (N bits), E (M bits)} after the image process to the output form converting unit 15. That is, various image processes are performed using the HDR pixel data of the floating-point form.

The output form converting unit 15 converts the first HDR pixel data {Y (N bits), E (M bits)} after the image process, which is received from the image processing unit 14, into pixel data of bit number (which is susceptible to be treated) according to the capability of the output device 200. In more detail, the first HDR pixel data {Y (N bits), E (M bits)} is converted into second HDR pixel data of {Y (n bits (n is a natural number of N>n)), E (m bits (m is a natural number of M>m))}.

The second HDR image data is composed of the second HDR pixel data of one frame.

In this converting process, the image of the first HDR image data is analyzed (edge extraction) to acquire information of components of the image. From the acquired information, the values of the exponential parts E of pixels of every component are set to the same value. When the values of the exponential parts are set to the same value, the values of the mantissa parts of the pixel values are changed in accordance with the same value of the exponential value, for each component.

Next, the operation of the present embodiment will be described.

First, in the image pickup unit 10, an optical image of a subject is picked up at the two types of exposure times including the standard exposure time and the short exposure time and the 10-bit standard exposure RAWI data configuring the standard exposure image data and the 10-bit short exposure RAWI data configuring the short exposure image data are independently output to the image synthesis unit 11a through the two output channels CH1 and CH2 for each line of the pixels.

When the short exposure RAWI data is received from the image pickup unit 10, the image synthesis unit 11a stores the received short exposure RAWI data in the frame memory 13 through the memory arbiter 12. Meanwhile, when the standard exposure RAWI data is received from the image pickup unit 10, the image synthesis unit 11a reads the short exposure RAWI data corresponding to the received standard exposure RAWI data from the frame memory 13 through the memory arbiter 12.

When the short exposure RAWI data is read, the image synthesis unit 11a multiplies the pixel value indicated by the standard exposure RAWI data and the pixel value indicated by the short exposure RAWI data at the same pixel position by the coefficient (for example, 1000 times) set according to the exposure ratio, for each pixel, by the multiplier of the image synthesis unit 11a and adds the pixel values indicated by the multiplied RAWI data by the adder, thereby generating the HDR pixel data (HDRi data) expressing the pixel values by the 32-bit fixed-point form. The generated HDRi data is output to the floating-point processing unit 11b.

When the HDRi data is received from the image synthesis unit 11a, the floating-point processing unit 11b converts the HDRi data into the first HDR pixel data of which the pixel values are expressed by the floating-point form in which the mantissa part has 10 bits, the cardinal number is 2 (X=2) and the exponential part of the cardinal number 2 has 10 bits, according to Equation 1.

$$\text{Pixel value(brightness value)} = RAWi \times 2^{RAWe-512} \quad (1)$$

provided that RAWi (10 bits), RAWe (10 bits), and RAWe≧512($2^9$).

From Equation 1, the range of the pixel value (output signal) is determined to a value when RAWi is 0 to 1023 and RAWe is $2^{511}$. A minimum step is a value when RAWi is 1 and RAWe is $2^{-512}$.

The range of the pixel value after linear synthesis depends on a coefficient multiplication of the multiplier. For example, if the coefficient is 1000 times, the value of the exponential part is about 10 and obtains a sufficient range.

That is, $RAWi \times 2^{RAWe-512}$ obtained by converting the 32-bit HDRi data into data having a 10-bit mantissa part and a 10-bit exponential part according to Equation 1 becomes the HDR pixel data (first HDR pixel data) of the floating-point form.

In this first HDR pixel data, only {RAWi, RAWe} is output to the image processing unit 14.

When the first HDR pixel data {RAWi, RAWe} is received, the image processing unit 14 performs the image process such as the process of increasing the spatial resolution, the process of correcting the brightness level and the process of removing the noise and outputs {mantissa part, exponential part}={Y (10 bits), E (10 bits)}.

This image process is performed by multiplication and adding (for example, Equation 2).

$$OUT = A \times \alpha + B \times \gamma + C \times \beta \qquad (2)$$

In Equation 2, A, B and C are coefficients and $\alpha$, $\gamma$ and $\beta$ are input values (pixel values).

In the present embodiment, this basic process is performed by the floating-point arithmetic operation. That is, the pixel value and the coefficient value are expressed by the floating-points with precision of a 10-bit exponential part and a 10-bit mantissa part. Here, in the coefficient, an amplification ratio of a processing system is generally 1 (A+B+C=1) and is a value of 1 or less. Accordingly, in order to ensure arithmetic operation precision, the exponential part of the coefficient is expressed by Equation 3.

$$\text{Exponential part} = 2^{k-2(M-1)} \qquad (3)$$

In Equation 3, k is an integer value of 0 to 1023.

Since M=10, the exponential part can be expressed by a value of $2^{-512}$ to $2^{511}$ and has precision of 9 bits ($1/512 = 1/2^9$) below a point of a binary number.

A floating-point multiplier in which the bit lengths of the mantissa part and the exponential part are fixed can be realized by the multiplication of the mantissa parts and the adding of the exponential parts as Equation 4 and thus miniaturization is possible unlike a fixed-point multiplier.

$$OUT = A \times 2^i \times B \times 2^j = A \times B \times 2^{i+j} \qquad (4)$$

In Equation 4, if The arithmetic operation result of "A×B" exceeds the D range (10 bits) and becomes smaller than ½ of the D range, an increment or decrement process is performed with respect to the arithmetic operation result (i+j) of the exponential part. This exponential part process corresponds to exposure control of a digital camera. If the brightness is large (bright), the exponential part is increased (EV value is decreased) and, if the brightness is small (dark) the exponential part is decreased (EV value is increased). In the image process of the present embodiment, since the cardinal number is 2, the concept of the EV value of the image pickup operation is expanded and is applied to the pixel value.

The first HDR pixel data {Y (10 bits), E (10 bits)} after the image process is output to the output form converting unit 15.

When the first HDR pixel data {Y (10 bits), E (10 bits)} after the image process is received from the image processing unit 14, the output form converting unit 15 converts the bit numbers of the mantissa part and the exponential part of the first HDR pixel data according to the capability of the output device 200.

Hereinafter, the HDR pixel data obtained by this conversion is called second HDR pixel data.

Here, the output device 200 is a display device or a printing device for allowing a person to view (appreciate) an output image and converts the first HDR pixel data {Y (10 bits), E (10 bits)} into the second HDR pixel data {Y (8 bits), E (4 bits)}.

That is, the output form converting unit 15 converts the first HDR pixel data configuring the first HDR image data into the second HDR pixel data having the D range and a gradation property close to the recognition capability of the image viewed by the eyes of a person. Second HDR image data is configured by the second HDR pixel data after conversion.

In the converting process, the image of the first HDR image data configured by the first HDR pixel data {Y (10 bits), E (10 bits)} is analyzed (brightness variation extraction, edge extraction or the like) and the information on the components of the image is acquired. From the acquired information, the values of the exponential parts E of the pixel values are set to the same value for each component.

For example, if a subject includes a window and a wall, the values of the exponential parts E of the pixel values configuring the window image are set to the same value and the values of the exponential parts E of the pixel values configuring the wall image are set to the same value. Accordingly, at the time of image reproduction, it is possible to form an image without uncomfortable feeling by only the mantissa part.

Accordingly, the second HDR image data having a configuration suitable for the recognition capability of the image viewed by the eyes of the person and a reduced amount of data is generated.

The generated second HDR image data is output to the output device 200. The output device 200 displays or prints the image of the second HDR image data.

The image pickup device 100 according to the present embodiment can generate the first HDR image data configured by the first HDR pixel data of which the pixel values are expressed by the floating-point form and the image process including the floating-point arithmetic operation can be performed using the first HDR pixel data of the floating-point form.

Accordingly, the circuit scale necessary for the image process can be reduced compared with the case of performing the arithmetic operation by the fixed-point form, with respect to the HDR image data of the same level. By miniaturization, an image processing speed can be improved.

The first HDR image data (for example, the first HDR pixel data is {Y (10 bits), E (10 bits)} after the image process is converted according to the capability of the output device so as to generate the second HDR image data (for example, the second HDR pixel data is {Y (8 bits), E (4 bits)}) which is suitable for the gradation capability of the output device and has a smaller amount of information compared with the first HDR image data.

Accordingly, it is possible to output the HDR image data having a D range and a gradation property suitable for the capability of the output device and a reduced amount of data. Accordingly, it is possible to reduce the capacity necessary for storage of data or a bus width necessary for transmission of data, compared with the output of the first HDR image data.

When the HDR image data (integer) is converted into the first HDR image data of the floating-point form, the cardinal number is set to 2 such that the exponential part is treated as the exposure amount (EV value) in the exposure control, in the image process.

The values of the exponential values E in the second HDR image data can be set to the same value, for each component of the image.

Accordingly, at the time of the image reproduction, it is possible to form an image without uncomfortable feeling using only the mantissa part.

In the first embodiment, the image pickup unit 10 corresponds to an image pickup unit of a first or second aspect or an image pickup step of a tenth aspect, the HDR image data generating unit 11 corresponds to a HDR image data generating unit of any one of the first, second and fourth aspects or a HDR image data generating step of an eleventh aspect, the image processing unit 14 corresponds to an image processing unit of the first aspect or a ninth aspect or an image processing step of an eleventh aspect, and the output form converting unit 15 corresponds to a HDR image data converting unit of the first aspect or an eighth aspect or a HDR image data converting step of the eleventh aspect.

In the first embodiment, the standard exposure image data corresponds to first image data of any one of the first, second, third, tenth, eleventh, twelfth and thirteenth aspects and the short exposure image data corresponds to second image data of any one of the first, second, third, tenth, eleventh, twelfth and thirteenth aspects.

Second Embodiment

Figure 3:
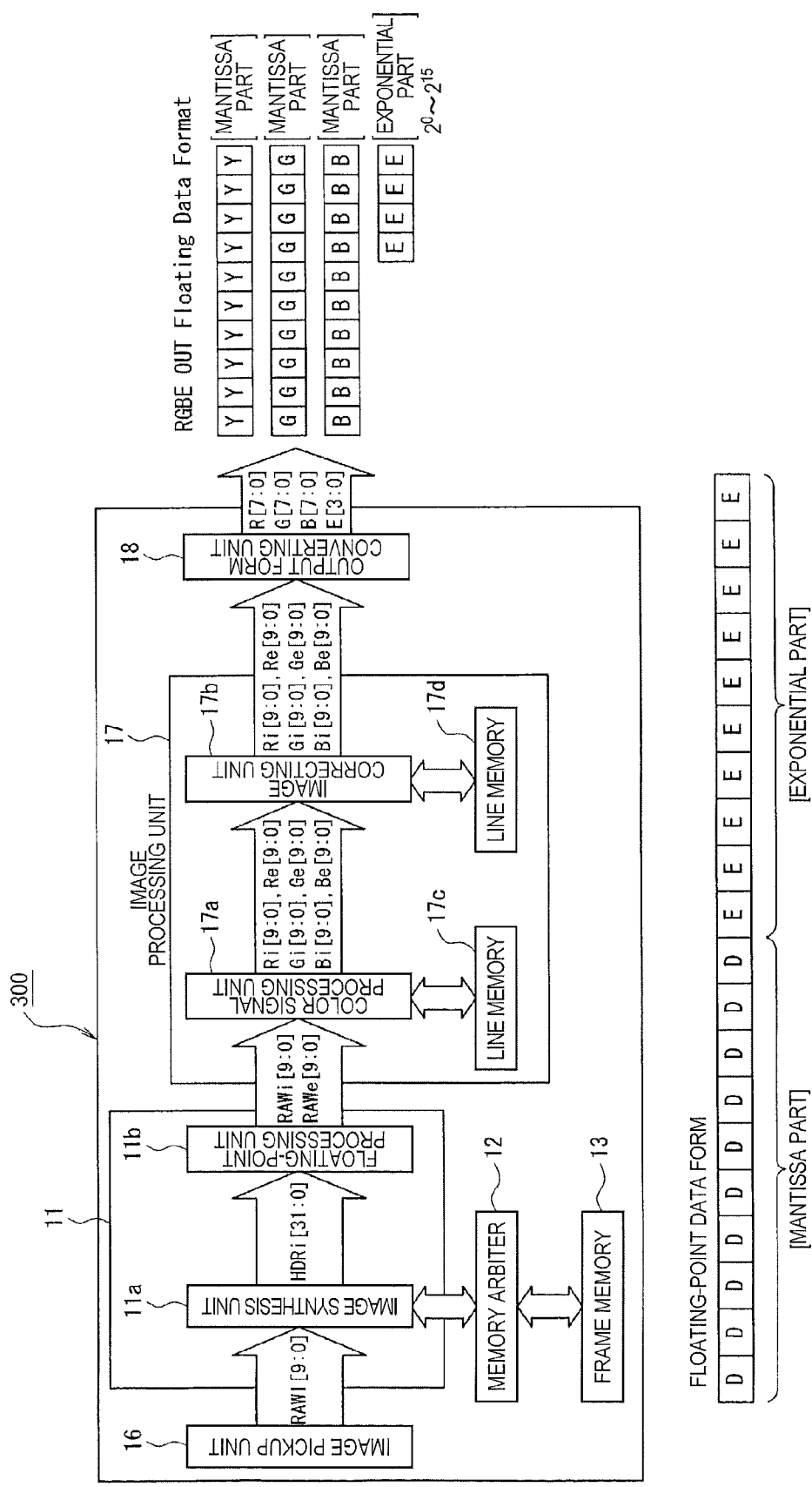
FIG. 3 is a block diagram showing the configuration of an image pickup device 300.

Next, an image pickup device, an image pickup system, an image pickup method, an image processing device and an image processing method according to a second embodiment of the invention will be described with reference to the accompanying drawing. FIG. 3 is a view showing the image pickup device, the image pickup system, the image pickup method, the image processing device and the image processing method according to the second embodiment of the invention. FIG. 3 is a block diagram showing the configuration of the image pickup device 300.

The present embodiment is different from the image pickup device 100 according to the first embodiment in that an image pickup unit has a single plate image pickup element and color filters for dividing an optical signal into color pixel signals of respective color elements of a plurality of color elements corresponding to predetermined color spaces, a color interpolation process is performed so as to generate first HDR image data configured by plural pieces of pixel data of a floating-point form corresponding to the color elements, and the first HDR pixel data of the first HDR image data is converted into second HDR pixel data, which is configured by a mantissa part corresponding to the color elements and an exponential part which is common to the plurality of color elements and a reduced amount of information for each pixel, so as to generate the second HDR image data. Hereinafter, the same components as the image pickup device 100 according to the first embodiment are denoted by the same reference numerals and thus the description thereof will be omitted or simplified and only different points will be described in detail.

First, the configuration of the image pickup device 300 according to the present embodiment will be described with reference to FIG. 3.

As shown in FIG. 3, the image pickup device 300 includes the image pickup unit 16 which has the single plate image pickup element and the color filters for color separation corresponding to RGB color spaces composed of color elements of R (red), G (green) and B (blue) and picks up a subject at plural types of exposure times, a HDR image data generating unit 11 for generating first HDR image data of a float-point form on the basis of image data of the subject picked up at the plural types of exposure times by the image pickup unit 16, a memory arbiter 12, a frame memory 13, an image processing unit 17 for performing an image process such as a color interpolation process or a noise removing process, and an output form converting unit 18 for converting the output form of the first HDR image data corresponding to the color elements after the image process. Although the output device is not shown in FIG. 3, similar to the image pickup device 100 according to the first embodiment, the output device 200 shown in FIG. 1 is used as an output device.

The image pickup unit 16 has the single plate image pickup element and the color filters corresponding to the RGB color spaces and, in the present embodiment, picks up the subject at a standard exposure time and a short exposure time. By this pickup process, standard exposure color image data (each RAWI data has a fixed-point form and 10 bits) corresponding to the standard exposure time and short exposure color image data (each RAWI data has a fixed-point form and 10 bits) corresponding to the short exposure time are obtained.

The standard exposure color image data and the short exposure color image data obtained by the pickup process are output to an image synthesis unit 11a.

The color filters have a configuration in which a plurality of filter parts R, G and B are arranged in a Bayer array.

The image synthesis unit 11a synthesizes RAWI data (hereinafter, referred to as standard exposure RAWIC data) configuring the standard exposure color image data obtained by the image pickup unit 16 and RAWI data (hereinafter, referred to as short exposure RAWIC data) configuring the short exposure color image data and generates color HDRi data (hereinafter, referred to as RGBHDRi data) of which the pixel values are expressed by 32-bit fixed-point form.

The floating-point processing unit 11b converts the RGB-HDRi data (32 bits) generated by the image synthesis unit 11a into first color HDR pixel data of which the pixel values are expressed by the floating-point form in which a mantissa part has NC bits (NC is a natural number of $32 > NC \geq 2$), a cardinal number is X, and an exponential part of the cardinal number has MC bits (MC is a natural number of $32 > MC \geq 2$).

The image processing unit 17 includes a color signal processing unit 17a, an image correcting unit 17b, a line memory 17c and a line memory 17d.

The color signal processing unit 17a performs a color interpolation process using the first color HDR pixel data (pixel data to be processed) output from the HDR image data generating unit 11 and the first color HDR pixel data adjacent to the pixel to be processed, which is stored in the line memory 17c. That is, a process (color signal process) of generating a color signal (data) defined by the RGB color spaces is performed with respect to points of the image using the first color HDR image data, which is delayed by the line memory.

As the color signal process, there are a process (color interpolation process) of generating (interpolating) the color signal of each point of the image from the first color HDR pixel data and a process (color space converting process) of converting the first color HDR pixel data into color data defined by a predetermined color space. In the present embodiment, since the image pickup unit 16 has the color filters having the Bayer array corresponding to the single plate image pickup element, the color interpolation process is performed.

That is, the color signal processing unit 17a converts the first color HDR pixel data into color HDR pixel data of which the pixel values corresponding to the color elements of RGB are expressed by the floating-point form in which the mantissa part has NC bits, the cardinal number is X, and the exponential part of the cardinal number has MC bits, for each pixel, by the color interpolation process.

Accordingly, the first color HDR image data having first RHDR pixel data {Ri, Re} corresponding to the color element of R, first GHDR pixel data {Gi, Ge} corresponding to the color element of G and first BHDR pixel data {Bi, Be} corresponding to the color element of B is generated.

The image correcting unit 17b performs the image process such as a process (detail process) of increasing spatial resolution, a process of correcting a brightness level and a process of removing noise, using the first RHDR pixel data {Ri, Re}, the first GHDR pixel data {Gi, Ge} and the first BHDR pixel data {Bi, Be} from the color signal processing unit 17a and the first RHDR pixel data {Ri, Re}, the first GHDR pixel data {Gi, Ge} and the first BHDR pixel data {Bi, Be} stored in the line memory 17d.

First RHDR pixel data {Y (NC bits), E (MC bits)}, first GHDR pixel data {Y (NC bits), E (MC bits)} and first BHDR pixel data {Y (NC bits), E (MC bits)} after the image process are output to the output form converting unit 18.

The output form converting unit 18 converts the first RHDR pixel data, first GHDR pixel data and the first BHDR pixel data (all of which have {Y (NC bits), E (MC bits)}) into second RHDR pixel data, second GHDR pixel data and second BHDR pixel data of the bit number according to the capability of the output device 200 (which is easy to be treated).

In more detail, the first RHDR pixel data, the first GHDR pixel data and the first BHDR pixel data (all of which have {Y (NC bits), E (MC bits)}) configuring the first color HDR image data are converted into the second RHDR pixel data, the second GHDR pixel data and the second BHDR pixel data (all of which have {Y (n bits (n is a natural number of NC>n)), E (m bits (m is a natural number of MC>m)).

Accordingly, second color HDR image data having the second RHDR pixel data corresponding to the color element of R, the second GHDR pixel data corresponding to the color element of G, the second BHDR pixel data corresponding to the color element of B for each pixel is generated.

At this time, the values of the exponential parts E of the second RHDR pixel data, the second GHDR pixel data and the second BHDR pixel data corresponding to the respective pixels are set to the same value. The exponential values are unified such that the values of the mantissa parts of the second RHDR pixel data, the second GHDR pixel data and the second BHDR pixel data are not saturated or become minimum values.

That is, the second color HDR image data becomes data configured by a plurality (three) of mantissa parts corresponding to the color elements of RGB and an exponential part which is common to the RGB, for each pixel.

Next, the operation of the present embodiment will be described.

First, in the image pickup unit 16, the subject is picked up at two types of exposure times including the standard exposure time and the short exposure time and the 10-bit standard exposure RAWIC data configuring the standard exposure color image data and the 10-bit short exposure RAWIC data configuring the short exposure color image data are independently output to the image synthesis unit 11a through two output channels CH1 and CH2 for each line of the pixels.

When the short exposure RAWIC data is received from the image pickup unit 10, the image synthesis unit 11a stores the received short exposure RAWIC data in the frame memory 13 through the memory arbiter 12. Meanwhile, when the standard exposure RAWIC data is received from the image pickup unit 10, the image synthesis unit 11a reads the short exposure RAWIC data corresponding to the received standard exposure RAWIC data from the frame memory 13 through the memory arbiter 12.

When the short exposure RAWIC data is read, the image synthesis unit 11a multiplies the pixel value indicated by the standard exposure RAWIC data and the pixel value indicated by the short exposure RAWIC data at the same pixel position by the coefficient (for example, 1000 times) set according to the exposure ratio, for each pixel, by the multiplier of the image synthesis unit 11a and adds the pixel values indicated by the multiplied RAWIC data by the adder, thereby generating the RGBHDRi data expressing the pixel values by the 32-bit fixed-point form. The generated RGBHDRi data is output to the floating-point processing unit 11b.

When the RGBHDRi data is received from the image synthesis unit 11a, the floating-point processing unit 11b converts the RGBHDRi data, of which the pixel values are expressed by the 32-bit fixed floating form, into the first color HDR pixel data of which the pixel values are expressed by the floating-point form in which the RAWi has 10 bit, the cardinal number is 2 and the RAWe has 10 bits, according to Equation 1, similar to the first embodiment. Only {RAWi, RAWe} of the first color HDR pixel data is output to the next image processing unit 17.

The image processing unit 17 stores the first color HDR pixel data {RAWi (10 bits), RAWe (10 bits) from the floating-point processing unit 11b in the line memory 17c by the capacity of the line memory and the color signal processing unit 17a performs the color interpolation process on the basis of the first color HDR pixel data of the line memory 17c and the first color HDR pixel data from the floating-point processing unit 11b.

Accordingly, the first color HDR pixel data {RAWi, RAWe} of the first color HDR image data is converted into the first RHDR pixel data {Ri (10 bits), Re (10 bits)}, the first GHDR pixel data {Gi (10 bits), Ge (10 bits) and the first BHDR pixel data {Bi (10 bits), Be (10 bits)} corresponding to the respective color elements of R, G and B.

Next, the image correcting unit 17b stores the first RHDR pixel data {Ri, Re}, the first GHDR pixel data {Gi, Ge} and the first BHDR pixel data {Bi, Be} generated by the color processing unit 17a in the line memory 17d by the capacity of the line memory.

On the basis of {Ri, Re}, {Gi, Ge} and {Bi, Be} stored in the line memory 17d and {Ri, Re}, {Gi, Ge} and {Bi, Be} from the color signal processing unit 17a, the image process such as the process of increasing the spatial resolution, the process of correcting the brightness level and the process of removing the noise is performed and "{Ri, Re}, {Gi, Ge}, {Bi, Be}" after the image process is output to the output form converting unit 18.

When the first color HDR pixel data after the image process "{Ri (10 bits), Re (10 bits)}, {(Gi (10 bits), Ge (10 bits)), {Bi (10 bits), Be (10 bits)}" is received from the image processing unit 17, the output form converting unit 18 converts the bit numbers of the mantissa part and the exponential part of the first color HDR pixel data according to the capability of the output device 200 and generates the second color HDR pixel data such that the values of the exponential parts become the common value for each pixel.

Here, with respect to the conversion of the exponential parts, the exponential values are converted to the same value such that the values of the color elements (R, G, B) of the mantissa parts are not saturated or become minimum values. In order to avoid the saturation of the values of the mantissa parts, the conversion is performed according to a largest one of the exponential parts of the pixel values of the color elements.

When the values of the exponential parts are set to the same value, the values of the mantissa parts of the pixel values of the color elements are changed in accordance with the same value of the exponential value. When the mantissa parts are changed, the values of the color elements are not saturated.

Similar to the first embodiment, the output device 200 is a display device or a printing device for allowing a person to view (appreciate) an output image and converts the first RHDR pixel data {Ri (10 bits), Re (10 bits)}, the first GHDR pixel data {Gi (10 bits), Ge (10 bits) and the first BHDR pixel data {Bi (10 bits), Be (10 bits)} configuring the first color HDR image data into the second RHDR pixel data {R (8 bits)}, the second GHDR pixel data {G (8 bits)}, the second BHDR pixel data {B (8 bits)} and the exponential-part data {B (4 bits)} in which the amount of information is reduced according to the capability of the output device and the values of the exponential values become one value common to the color elements of R, G and B.

That is, the output form converting unit 18 converts the first color HDR image data into the color HDR image data (second color HDR image data) having the D range and a gradation property (close to the recognition capability of the image viewed by the eyes of a person) suitable for the capability of the output device.

Accordingly, the second color HDR image data having the gradation property close to the recognition capability of the image viewed by the eyes of the person and a reduced amount of data is generated.

The generated second color HDR image data is output to the output device 200. The output device 200 displays or prints the image of the second color HDR image data.

The image pickup device 300 according to the present embodiment can generate the first color HDR image data configured by the first color HDR pixel data of which the pixel values are expressed by the floating-point form and the image process including the floating-point arithmetic operation can be performed using the first color HDR pixel data of the floating-point form.

Accordingly, the circuit scale necessary for the image process can be reduced compared with the case of performing the arithmetic operation by the fixed-point form, with respect to the HDR image data of the same level. By miniaturization, an image processing speed can be improved.

Each pixel value of the first color HDR image data (for example, "{Ri (10 bits), Re (10 bits)}, {Gi (10 bits), Ge (10 bits)}, {Bi (10 bits), Be (10 bits)}" after the image process is converted according to the capability of the output device so as to generate the second color HDR image data (for example, data configured by pixel values of {R (8 bits), G (8 bits), B (8 bits), E (4 bits)}) which is configured by the pixel data of which the pixel values are expressed by the floating-point form and the exponential part is compiled to one.

Accordingly, it is possible to output the second color HDR image data having a D range and a gradation property suitable for the capability of the output device (close to the recognition capability of the image viewed by the eyes of the person) and a reduced amount of data. Accordingly, it is possible to reduce the capacity necessary for storage of data or a bus width necessary for transmission of data, compared with the output of the first HDR image data.

When the color HDR image data (integer) is converted into the first color HDR image data of the floating-point form, the cardinal number is set to 2 such that the exponential part is treated as the exposure amount (EV value) in the exposure control, in the image process.

The values of the exponential values E in the second color HDR image data can be set to the same value with respect to all the colors of the pixels.

Accordingly, since the exponential parts of the colors of the pixel values are common (one), it is possible to further reduce the capacity necessary for storage of data or a bus width necessary for transmission of data.

In the second embodiment, the image pickup unit 10 corresponds to an image pickup unit of a fifth aspect or an image pickup step of an eleventh aspect, the HDR image data generating unit 11 corresponds to a HDR image data generating unit of the fifth aspect or a HDR image data generating step of the eleventh aspect, the image processing unit 17 corresponds to an image processing unit of the fifth aspect or an image processing step of the eleventh aspect, and the output form converting unit 15 corresponds to a HDR image data converting unit of the fifth aspect or an eighth aspect or a HDR image data converting step of the eleventh aspect.

Although, in the first and second embodiments in the HDR image data generating unit 11, the image data corresponding to the plural types of exposure times (standard exposure time, the short exposure time) received from the image pickup unit 10 or 16 is synthesized by the image synthesis unit 11a and is converted into the first HDR image data of the floating-point form by the floating-point processing unit 11b, the image data received from the image pickup unit 10 or 16 may be converted into the image data of the floating-point form by the floating-point processing unit 11b and then may be synthesized by the image synthesis unit 11a. In this case, the image pickup unit 10 or 16 corresponds to the image pickup unit of the third aspect.

In the first and second embodiments, the image pickup device 100 or 300 may be divided into, for example, the image pickup unit 10 or 16 and the other configuration unit, both of which are connected to each other via a network so as to configure an image pickup system. The image pickup device may be divided into the image pickup unit 10 or 16, the image synthesis unit 11a of the HDR image data generating unit 11, and the other configuration unit, all of which are connected to one another via the network. In this case, the image pickup device 100 or 300 corresponds to an image pickup system of the tenth aspect.

In the first and second embodiments, if, for example, the image pickup unit 10 or 16 is excluded from the image pickup device 100 or 300, the other configuration unit may function as an image processing device. This image processing device may be configured by the other configuration unit excluding the image pickup unit 10 or 16 and the image synthesis unit 11a of the HDR image data generating unit 11 from the image pickup device 100 or 300. In this case, the image processing device having the above-described configuration corresponds to an image processing device of the twelfth aspect. In the image processing unit having the above-described configuration, the HDR image data generating unit 11, the image processing unit 14 or 17, and the output form converting unit 15 or 18 correspond to a HDR image data generating step, an image processing step and a HDR image data converting step of the thirteenth aspect, respectively.

Although, in the second embodiment, the image pickup unit 16 has the single plate image pickup element and the color filters corresponding to the predetermined color spaces (RGB color spaces), the invention is not limited thereto and the image pickup unit 16 may have a plurality (corresponding to the number of color elements configuring the predetermined color spaces) of image pickup elements (sensor cell array) and the image pickup elements may have respective color filters corresponding to different color elements in the plurality of color elements. For example, if a three-plate image pickup element corresponding to the RGB color spaces is used, the image pickup elements perform exposure by light passing through any one of the color filter for separating the color element of R, the color filter for separating the color element of G, and the color filter for separating the color element of B.

Each color filter is not limited to one color element and, for example, in the RGB color spaces, two color filters for separating the color element of G and one color filter in which R and B are arranged may be configured in the three-plate image pickup element.

Even in the RGB color spaces, two image pickup elements may be included and one color filter for separating the color element of G and one color filter in which R and B are arranged may be configured.

Instead of the color filters, for example, in the three-plate image pickup element, a configuration for separating the color by a prism and inputting the color signals to the image pickup elements corresponding thereto may be used.

In this case, the image pickup unit 16 corresponds to the image pickup unit of the sixth aspect.

Although, in the second embodiment, the RGB color spaces (color filters of primary colors) are, for example, described, the invention is not limited to this configuration and color filters configured by complementary colors, such as the color spaces configured by the color elements of Y (yellow), Mg (magenta), Cy (cyan) and G (green), may be used.

Although, in the second embodiment, the color filters of the Bayer array are used, the invention is not limited thereto and color filters having a sub-pixel type color array may be used.

Although, in the second embodiment, the color separation is performed using the color filters, the invention is not limited thereto and, for example, in the pixels of the image pickup elements, photodiodes may be laminated by three layers, all lights may cause photoelectric effect in a shallow layer, only red light may cause photoelectric effect in a deep layer, and the information on three colors of RGB are obtained at the same pixel position.

Although, in the first and second embodiments, the output form of the second HDR image data has a configuration in which the mantissa part has 8 bits, the cardinal number is 2 and the exponential part has 4 bits, the invention is not limited thereto. The mantissa part may have 7 bits or less or 9 bits or more, the cardinal number may be a value other than 2, and the exponential part may have 3 bits or less or 5 bits or more.

The entire disclosure of Japanese Patent Application Nos. 2007-038918, filed Feb. 20, 2007 and 2007-339521, filed Dec. 28, 2007 are expressly incorporated by reference herein.

What is claimed is:

1. An image pickup device comprising:
   an image pickup unit which picks up a subject at first and second exposure times;
   a high dynamic range (HDR) image data generating unit which generates first HDR image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up the subject at the first exposure time and second image data obtained by picking up the subject at the second exposure time;
   an image processing unit which performs a predetermined image process including a floating-point arithmetic operation process, with respect to the first HDR image data generated by the HDR image data generating unit; and
   a HDR image data converting unit which converts the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

2. The image pickup device according to claim 1, wherein the HDR image data generating unit includes an image synthesis unit which synthesizes the first image data and the second image data and generates HDR image data configured by pixel data of which pixel values are expressed by a fixed-point form, and a floating-point processing unit which converts the HDR image data into the first HDR image data.

3. The image pickup device according to claim 1, wherein the HDR image data generating unit includes a floating-point processing unit which converts the first image data and the second image data into image data configured by pixel data of which the pixel values are expressed by the floating-point form in which the mantissa part has the N bits, the cardinal number is X, the exponential part of the cardinal number has the M bits, and an image synthesis unit which synthesizes the first and second image data after conversion and generates the first HDR image data.

4. The image pickup device according to claim 1, wherein the HDR image data generating unit generates the first HDR image data in which the values of the exponential parts of the pixel data configuring pixel elements are set to the same value, for each pixel element configuring an image of the subject.

5. The image pickup device according to claim 1, wherein:
   the image pickup unit outputs the first image data, which is configured by a pixel signal including a signal relating to any one of a plurality of color elements corresponding to predetermined color spaces in the unit of a pixel and is obtained by picking up the subject at the first exposure time, and the second image data, which is configured by a pixel signal including a signal relating to any one of the plurality of color elements corresponding to the predetermined color spaces in the unit of the pixel and is obtained by picking up the subject at the second exposure time;
   the HDR image data generating unit generates the first HDR image data configured by the pixel data including the pixel value relating to any one of the plurality of color elements in the unit of the pixel, on the basis of the pixel signal configuring the first image data and the pixel signal configuring the second image data corresponding to the pixel signal configuring the first image data;
   the image processing unit performs a color interpolation process with respect to the first HDR image data and generates the first HDR image data configured by the pixel data including the pixel value relating to each of the plurality of color elements in the unit of the pixel; and
   the HDR image data converting unit converts the value of the mantissa part and the value of the exponential part of the pixel data configuring the first HDR image data such that the second HDR image data is configured by the pixel data including the pixel value relating to the plurality of color elements and the value of the exponential part of the pixel data becomes the same value in the plurality of color elements in the unit of the pixel.

6. The image pickup device according to claim 1, wherein:
   the image pickup unit outputs the first color image data, which is configured by a color pixel signal including a signal relating to a plurality of color elements corresponding to predetermined color spaces in the unit of a pixel and is obtained by picking up the subject at the first exposure time, and the second color image data, which is configured by a color pixel signal including a signal relating to the plurality of color elements corresponding to the predetermined color spaces in the unit of the pixel and is obtained by picking up the subject at the second exposure time;

the HDR image data generating unit generates the first HDR image data configured by the pixel data including the pixel value relating to each of the plurality of color elements in the unit of the pixel, on the basis of the color pixel signal configuring the first color image data and the color pixel signal configuring the second color image data corresponding to the color pixel signal configuring the first color image data; and the HDR image data converting unit converts the values of the mantissa part and the value of the exponential part of the pixel data configuring the first HDR image data such that the second HDR image data is configured by the pixel data including the pixel value relating to the plurality of color elements and the value of the exponential part of the pixel data becomes the same value in the plurality of color elements in the unit of the pixel.

7. The image pickup device according to claim 1, wherein the cardinal number is 2.

8. The image pickup device according to claim 1, wherein:
when the mantissa part of the pixel data configuring the first HDR image has 9 bits or more and the exponential part has 5 bits or more,
the HDR image data converting unit converts the first HDR image data into the second HDR image data configured by the pixel data in which the mantissa part has 8 bits and the exponential part has 4 bits.

9. The image pickup device according to claim 1, wherein the image processing unit includes a multiplying circuit which performs a multiplying process with respect to the value of the mantissa part of the pixel data configuring the first HDR image data and an adding circuit which performs an adding process with respect to the value of the exponential part thereof.

10. An image pickup method comprising:
picking up a subject at first and second exposure times;
generating first high dynamic range (HDR) image data configured by pixel data of which pixel values are expressed by a floating-point form in which a mantissa part has N bits (N is a natural number of 2 or more), a cardinal number is X (X is a natural number of 2 or more) and an exponential part of the cardinal number has M bits (M is a natural number of 2 or more), on the basis of first image data obtained by picking up the subject at the first exposure time and second image data obtained by picking up the subject at the second exposure time;
performing a predetermined image process including a floating-point arithmetic operation process, with respect to the first HDR image data generated by the generating of the HDR image data; and
converting the first HDR image data after the image process into second HDR image data configured by pixel data of which the pixel values are expressed by a floating-point form in which the mantissa part has n bits (n is a natural number of N>n) and the exponential part of the cardinal number has m bits (m is a natural number of M>m).

* * * * *